United States Patent [19]

Ohmori et al.

[11] Patent Number: 4,557,562
[45] Date of Patent: Dec. 10, 1985

[54] COPOLYMERS FOR OPTICAL FIBERS

[75] Inventors: Akira Ohmori, Ibaraki; Nobuyuki Tomihashi, Takatsuki; Takahiro Kitahara, Settsu, all of Japan

[73] Assignee: Daikin Kogyo Co., Ltd., Osaka, Japan

[21] Appl. No.: 651,648

[22] Filed: Sep. 17, 1984

Related U.S. Application Data

[63] Continuation of Ser. No. 491,235, May 3, 1983, abandoned.

[30] Foreign Application Priority Data

May 11, 1982 [JP] Japan ................................ 57-79665

[51] Int. Cl.$^4$ ..................... C08F 214/18; G02B 5/172
[52] U.S. Cl. .................................. 350/96.34; 526/245
[58] Field of Search ...................... 526/245; 350/96.29, 350/96.30, 96.33, 96.34

[56] References Cited

U.S. PATENT DOCUMENTS

| | | | |
|---|---|---|---|
| 3,386,977 | 6/1968 | Kleiner ................................. | 526/245 |
| 3,993,834 | 11/1976 | Chimura et al. ..................... | 428/394 |
| 4,138,194 | 2/1979 | Beasley et al. ...................... | 428/373 |
| 4,298,245 | 11/1981 | Aulich et al. ....................... | 350/96.3 |

*Primary Examiner*—Harry Wong, Jr.
*Attorney, Agent, or Firm*—Larson and Taylor

[57] ABSTRACT

A copolymer for optical fibers of fluoroalkylmethacrylate and acrylic acid.

3 Claims, No Drawings

COPOLYMERS FOR OPTICAL FIBERS

This application is a continuation of application Ser. No. 491,235, filed May 3, 1983, now abandoned.

This invention relates to fluoroalkylmethacrylate copolymers which are useful as cladding materials in manufacturing fibers for light transmission (hereinafter referred to as light-transmission fibers).

Heretofore used as core materials for light-transmission fibers are glass, polystyrene, polymethylmethacrylate and the like which have excellent light-transmitting properties. Cladding materials for light-transmission fibers must be low in refractive index and outstanding in transparency, elasticity, adhesiveness to core materials and heat resistibility.

It has been proposed to use as cladding materials a variety of fluorine-containing resins because of their low refractive index. For example, Japanese Examined Patent Publication No. 8978/1968 discloses light-transmission fibers comprising an alkylmethacrylate polymer as a core material and a fluoroalkylmethyacrylate or fluoroalkylacrylate copolymer as a cladding material which copolymer comprises repeating units derived from monomers represented by the formula

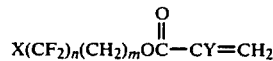

wherein X represents hydrogen, fluorine or chlorine, n is an integer of 2 to 10, m is an integer of 1 to 6, and Y represents hydrogen or methyl group. However, it has been found that the foregoing copolymer is not sufficient in any of heat resistibility and adhesiveness to core materials. In shaping fibers, such copolymer decomposes and foams at a temperature of about 220° to 240° C., thereby forming bubbles in the cladding. Further, the copolymer renders it difficult to obtain light-transmission fibers involving a small loss of light energy because its poor adhesiveness to core materials causes light scattering at the interface between the core and cladding. In recent years, attention has been focussed on the use of light-transmission fibers of plastics materials in the manufacture of terminal equipment for optical communication, since the light-transmission fibers of plastics materials are inexpensive to manufacture and can be mass produced. But the light-transmission fibers of plastics materials heretofore known involve a great loss of light energy and thus are not suited to production of the terminal equipment. In the present situation, there is a demand for light-transmission fibers of plastics materials entailing a small loss of light energy.

It is an object of the present invention to provide copolymers for optical fibers.

It is another object of the invention to provide copolymers suitable as cladding materials for optical fibers.

It is a further object of the invention to provide cladding materials of plastics for optical fibers which involve an extremely small loss of light energy.

It is a still further object of the invention to provide cladding materials for optical fibers which materials have excellent adhesiveness to the core materials and high heat resistibility.

Other objects and features of the present invention will become apparent from the following description.

The foregoing objects of the present invention can be achieved by using as cladding materials for optical fibers a copolymer of fluoroalkylmethacrylate and acrylic acid, the fluoroalkylmethacrylate having such properties that a homopolymer of the fluoroalkylmethacrylate has a glass transition temperature and a refractive index each in the range given by the following formulae (I) and (II), respectively:

$$1/Tg \leq 9.47 \times 10^{-3} - 4.556 \times 10^{-3} n^{20} \quad (I)$$

$$n^{20} \leq 1.42 \quad (II)$$

wherein Tg represents the glass transition temperature of the homopolymer and $n^{20}$ represents the refractive index of the homopolymer.

We conducted extensive research to develop cladding materials which retain the low refractive index and good transparency of polyfluoroalkylmethacrylate and which have high heat resistibility and excellent adhesiveness to the core material, and found that a copolymer comprising fluoroalkylmethacrylate having specific polymeric characteristics and acrylic acid is excellent in heat resistibility and in adhesiveness to the core and possesses remarkable properties required for optical fibers such as a low refractive index and a high glass transition temperature, hence suitable as cladding materials for optical fibers. This novel finding has matured to the present invention.

This invention provides a copolymer of fluoroalkylmethacrylate and acrylic acid, the fluoroalkylmethacrylate having such properties that a homopolymer of the fluoroalkylmethacrylate has a glass transition temperature and a refractive index each in the range given by the following formulae (I) and (II), respectively:

$$1/Tg \leq 9.47 \times 10^{-3} - 4.556 \times 10^{-3} n^{20} \quad (I)$$

$$n^{20} \leq 1.42 \quad (II)$$

wherein Tg represents the glass transition temperature of the homopolymer and $n^{20}$ represents the refractive index of the homopolymer.

Typical examples of fluoroalkylmethacrylate the homopolymer of which have the glass transition temperature of the formula (I) and the refractive index of the formula (II) are trifluoroethylmethacrylate (Tg=73° C., $n^{20}$=1.4107, the two values being shown hereinafter in this order), 2,2,3,3-tetrafluoropropylmethacrylate (75° C., 1.4200), 2,2,3,3,3-pentafluoropropylmethacrylate (72° C., 1.395), 2-trifluoromethyl-3,3,3-trifluoropropylmethacrylate (75° C., 1.3922), 2-trifluoromethyl-2,3,3,3-tetrafluoropropylmethacrylate (79° C., 1.3800), 2,2,3,4,4,4-hexafluorobutylmethacrylate (50° C., 1.4010), 1-methyl-2,2,3,4,4,4-hexafluorobutylmethacrylate (65° C., 1.4005), 1,1,2,2-tetrahydroperfluorodecylmethacrylate (89.5° C., 1.3672), 1,1,2,2-tetrahydro-9-trifluoromethylperfluorodecylmethacrylate (81.5° C., 1.3650), 1,1-dihydroperfluorobutylmethacrylate (56° C., 1.3900), 1,1-dimethyl-2,2,3,3-tetrafluoropropylmethacrylate (93° C., 1.4200), 1,1-dimethyl-2,2,3,3,4,4,5,5-octafluoropentylmethacrylate (65° C., 1.3988), 1,1-dimethyl-2,2,3,4,4,4-hexafluorobutylmethacrylate (83° C., 1.4008), etc.

According to the present invention, the acrylic acid to be copolymerized with the fluoroalkylmethacrylate is used to improve the adhesiveness to the core and the heat resistibility. The amount of the acrylic acid to be used is 0.5 to 10% by weight, preferably 1 to 7% by weight, based on the weight of the fluoroalkylmethacrylate. The acrylic acid content of less than 0.5% by weight fails to enhance the adhesiveness and heat resistibility. With its amount in excess of 10% by weight, cross linking is likely to occur at a temperature of 220° to 240° C. during the shaping operation.

With this invention, other monomers can be incorporated as components in the present copolymer to adjust the numerical aperture required for a specific use, because the numerical aperture depends on the both values of refractive indexes of the core and cladding. Usable as such additional monomers are any suitable compounds which do not impair the properties required of cladding materials for optical fibers such as a refractive index and glass transition temperature. Preferable of these monomers is methacrylic acid ester, particularly methyl methacrylate. The amount of such monomers to be used is not particularly limited, unless the required properties for the cladding materials are deteriorated. Usually the amount thereof is less than 30% by weight relative to the weight of the fluoroalkylmethacrylate.

The copolymer of the present invention for use as cladding materials is prepared by the conventional polymerization method such as solution polymerization, suspension polymerization, bulk polymerization, emulsion polymerization and the like.

Suitable polymerization initiators useful in preparing copolymers for cladding materials by solution, suspension or bulk polymerization method are organic peroxides among which it is preferred to use isobutyrylperoxide, octanoylperoxide, di-i-propylperoxydicarbonate, $[Cl(CF_2CFCl)_2CF_2COO]_2$, $[H(CF_2CF_2)_3COO]_2$ and $(ClCF_2CF_2COO)_2$. The emulsion polymerization method employs persulfate as an oxidizing agent such as ammonium persulfate, potassium persulfate, etc.; sodium sulfite or the like as a reducing agent; salts of iron (II) sulfate or like transition metals as a redox initiator.

Solvents which can be used in preparing the present copolymer by solution or suspension method include fluorine-type solvents such as $CCl_2F_2$, $CCl_2FCClF_2$, $CClF_2CClF$,

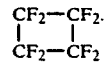

The polymerization temperature is usually 0° to 100° C. and preferably 10° to 80° C., although it can be determined according to the decomposition temperature of the polymerization initiator. The reaction pressure is between 1 and 50 kg/cm²G.

The cladding materials of the present invention can be used conjointly with any of suitable known core materials for optical fibers. The process for assembling optical fibers from the cladding material of the present invention and the conventional core material is not particularly limitative but can be appropriately adopted from known methods.

Since the present cladding materials for optical fibers are excellent in adhesiveness to the core, the materials do not cause the reduction in the amount of light transferred which is attributable to light scattering at the interface between the core and cladding due to a poor adhesiveness to the core. Moreover, the present cladding materials have an outstanding transparency, elasticity and heat resistibility in addition to the foregoing properties.

The present invention will be described below in greater detail with reference to the following examples and comparison examples in which all parts and percentages are by weight unless otherwise specified.

EXAMPLE 1

Into an autoclave were placed 95 parts of 2,2,3,3,3-pentafluoropropylmethacrylate and 5 parts of acrylic acid, and 0.025 part of azobisisobutyronitrile and 0.05 part of n-dodecylmercaptan were added after which bulk polymerization was conducted at 70° C. and completed in about 7 hours. The copolymer thus obtained was dried at 130° C. for 13 hours by a vacuum drying apparatus. The dried copolymer amounted to 93 parts and was found to have a refractive index of 1.400, a softening point of 81° C. and a melt viscosity of $8 \times 10^{-3}$ poise at 220° C.

A composite filament having a diameter of 400μ and a cladding thickness of 20μ was formed by extrusion at 230° C. by using methyl polymethacrylate as a core material and the copolymer obtained above as a cladding material.

The filament was 81%/50 cm in light transmission ratio. A 60 cm length of the filament was subjected to a bending test in which one end of the filament was attached to a fixed terminal of a bending tester and the other end to a movable terminal thereof disposed at a spacing of 5 cm from the fixed terminal. The movable terminal was reciprocated between the distance of 5–55 cm from the fixed terminal. The light transmission ratio of the filament was measured after 1000 times repetition of the bending test and was found to be 80%/50 cm which was a similar value of the ratio before the test.

EXAMPLES 2 TO 10

Nine kinds of copolymers made of monomers listed in Table 1 below were prepared by the same polymerization method as in Example 1. Polymethylmethacrylate was used as a core material and each copolymer as a cladding material. Composite filaments were produced in the same manner as in Example 1 and subjected to the bending test.

Table 1 shows monomer ratios used in preparation of copolymers, the glass transition temperatures and the refractive indexes of copolymers, the light transmission ratios (%/50 cm) of the filaments before and after the bending test, and the glass transition temperatures and the refractive indexes of fluoroalkylmethacrylate homopolymers.

TABLE 1

| | Monomer | | | | | Properties of copolymer | | Light transmission ratio of filament % | | Properties of homopolymer of fluoroalkyl-methacrylate alone | |
| --- | --- | --- | --- | --- | --- | --- | --- | --- | --- | --- | --- |
| Example | Fluoroalkyl-methacrylate monomer | % | Methyl methacrylate % | Acrylic acid % | $n^{20}$ | Tg (°C.) | Before** test | After** test | Tg (°C.) | $n^{20}$ | |
| 2 | 4F₁M | 99 | 0 | 1 | 1.420 | 76 | 78 | 76 | 75 | 1.4200 | |
| 3 | 3FE | 95 | 0 | 5 | 1.415 | 76 | 79 | 78 | 73 | 1.4107 | |

TABLE 1-continued

| | Monomer | | | | Properties of copolymer | | Light transmission ratio of filament % | | Properties of homopolymer of fluoroalkyl-methacrylate alone | |
|---|---|---|---|---|---|---|---|---|---|---|
| | Fluoroalkyl-methacrylate | | Methyl methacrylate | Acrylic acid | | | | | | |
| Example | monomer | % | % | % | $n^{20}$ | Tg (°C.) | Before** test | After** test | Tg (°C.) | $n^{20}$ |
| 4 | 6FM | 75 | 21 | 4 | 1.420 | 70 | 78 | 78 | 50 | 1.4010 |
| 5 | 6FE | 80 | 16 | 4 | 1.418 | 70 | 79 | 78 | 65 | 1.4005 |
| 6 | i6FC | 72 | 25 | 3 | 1.420 | 83 | 78 | 77 | 75 | 1.3922 |
| 7 | i7FC | 70 | 26 | 4 | 1.416 | 87 | 79 | 78 | 79 | 1.3800 |
| 8 | 17F | 65 | 29 | 6 | 1.415 | 76 | 79 | 79 | 89.5 | 1.3672 |
| 9 | 7F | 73 | 23 | 4 | 1.420 | 74 | 78 | 77 | 56 | 1.3900 |
| 10 | 4F₂iP | 80 | 19 | 1 | 1.419 | 72 | 78 | 77 | 65 | 1.3988 |

*Details of monomers are shown later.
**Bending test

COMPARISON EXAMPLES 1 TO 5

Five kinds of copolymers were prepared by the same polymerization method as in Example 1 using monomers listed in Table 2 given below. Composite filaments were formed in the same manner as in Example 1 by using polymethylmethacrylate as a core material and each copolymer obtained above as a cladding material. The filaments were subjected to the bending test.

Table 3 below shows the properties of fluoroalkylmethacrylate homopolymer and copolymers and the light transmission ratio of the filaments before and after the bending test.

In Table 1 and 3, Tg was obtained by measuring heat absorption with use of DSC II Model, while increasing the temperature at a rate of 10° C./mini; the refractive index was measured by using D line of sodium at 20° C. with use of Abbe refractometer; and the light transmission ratio of the filaments was measured according to ASTM D 1003 (1961).

TABLE 2

| | Monomer | | | |
|---|---|---|---|---|
| | Fluoroalkyl-methacrylate | | Methyl methacrylate | Acrylic acid |
| Comparison Example | Monomer | % | % | % |
| 1 | 17F | 65 | 35 | 0 |
| 2 | 17F | 65 | 20 | 15 |
| 3 | 17F | 65 | 29 | (Butyl acrylate) |

TABLE 2-continued

| | Monomer | | | |
|---|---|---|---|---|
| | Fluoroalkyl-methacrylate | | Methyl methacrylate | Acrylic acid |
| Comparison Example | Monomer | % | % | % |
| 4 | i7FN₂ | 42 | 52 | 6 |
| 5 | i7FN₂ | 61 | 36 | 3 |

TABLE 3

| | Monomer | | Light transmission ratio of filament (%) | | Properties of homopolymer of fluoroalkyl-methacrylate alone | | |
|---|---|---|---|---|---|---|---|
| Comp. Example | $n^{20}$ | Tg (°C.) | Before* test | After* test | $n^{20}$ | Tg (°C.) | Remarks |
| 1 | 1.413 | 76 | 45 | >30 | 1.3672 | 89.5 | The copolymer foamed in extrusion. |
| 2 | 1.420 | 76 | — | — | 1.3672 | 89.5 | The copolymer had light color and cross linking occurred, hindering fiberization. |
| 3 | 1.415 | 62 | 76 | 49 | 1.3672 | 89.5 | The copolymer foamed in extrusion. |
| 4 | 1.445 | 70 | 46 | 47 | 1.3700 | 30 | |
| 5 | 1.420 | 56 | 48 | 48 | 1.3700 | 30 | The copolymer became highly viscous and adhered to the inside of the hopper. Fiberization was difficult. The cladding material had a low Tg value and a poor bending resistance. |

*Bending test

Note: The monomers of fluoroalkylmethacrylate shown in Tables 1 and 2 refer to compounds represented by the formula

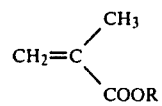

wherein R is as indicated below

| Monomer | —R |
|---|---|
| 4F₁M | —CH₂CF₂CF₂H |
| 3FE | —CH₂CF₃ |
| 6FM | —CH₂CF₂CFHCF₃ |
| 6FE | —CHCF₂CFHCF₃<br>\|<br>CH₂CH₃ |

-continued

| Monomer | —R |
|---|---|
| i6FC | —CH$_2$CH(CF$_3$)$_2$ |
| i7FC | —CH$_2$CF(CF$_3$)$_2$ |
| 17F | —CH$_2$CH$_2$C$_8$F$_{17}$ |
| 7F | —CH$_2$CF$_2$CF$_2$CF$_3$ |
| 4F$_2$iP | —C(CH$_3$)$_2$(CF$_2$CF$_2$)H |
| i7FN$_2$ | —CH$_2$CH$_2$(CF$_2$CF$_2$)CF(CF$_3$)$_2$ |

We claim:

1. In an optical fiber comprising a cladding and a core, the improvement wherein said cladding comprises a copolymer consisting essentially of (a) fluoroalkylmethacrylate, said fluoroalkymethacrylate giving, when singly polymerized, a homopolymer having the properties of a glass transition temperature and a refractive index satisfying the following formulae (I) and (II), respectively.

$$1/T_g \leq 9.47 \times 10^{-3} - 4.556 \times 10^{-3} \times n^{20} \quad (I)$$

$$n^{20} \leq 1.42 \quad (II)$$

wherein $T_g$ represents the class transition temperature and $n^{20}$ represents the refractive index of said hompolymer, (b) 0.5 to 10% by weight of acrylic acid based on the weight of said fluoroalkylmethacrylate, and (c) 0 to 30% by weight of a methacrylic acid ester based on the weight of said fluoroalkylmethacrylate.

2. An optical fiber according to claim 1 wherein said fluoroalkylmethacrylate is selected from the group consisting of trifluoroethylmethacrylate, 2,2,3,3-tetrafluoropropylmethacrylate, 2,2,3,3,3-pentafluoropropylmethacrylate, 2-trifluoromethyl-3,3,3-trifluoropropylmethacrylate, 2-trifluoromethyl-2,3,3,3-tetrafluoropropylmethacrylate, 2,2,3,4,4,4-hexafluorobutylmethacrylate, 1-methyl-2,2,3,4,4-hexafluorobutylmethacrylate, 1,1,2,2-tetrachydro-9-trifluoromethylperfluorodecylmethacrylate, 1,1-dihydroperfluorobutylmethacrylate, 1,1-dimethyl-2,2,3,3-tetrafluoropropylmethacrylate, 1,1-dimethyl-2,2,3,3,4,4,5,5-octafluoropentylmethacrylate and 1,1-dimethyl-2,2,3,4,4,4-hexafluorobutylmethacrylate.

3. An optical fiber according to claim 1 wherein said methacrylic acid ester comprises methylmethacrylate.

* * * * *